United States Patent
Yi et al.

(10) Patent No.: US 10,159,067 B2
(45) Date of Patent: Dec. 18, 2018

(54) METHOD AND APPARATUS FOR PERFORMING UPLINK TRANSMISSION IN A WIRELESS COMMUNICATION SYSTEM

(71) Applicant: LG ELECTRONICS INC., Seoul (KR)

(72) Inventors: Yunjung Yi, Seoul (KR); Suckchel Yang, Seoul (KR); Joonkui Ahn, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 205 days.

(21) Appl. No.: 14/430,048

(22) PCT Filed: Sep. 17, 2013

(86) PCT No.: PCT/KR2013/008400
§ 371 (c)(1),
(2) Date: Mar. 20, 2015

(87) PCT Pub. No.: WO2014/046457
PCT Pub. Date: Mar. 27, 2014

(65) Prior Publication Data
US 2015/0245347 A1    Aug. 27, 2015

Related U.S. Application Data

(60) Provisional application No. 61/703,287, filed on Sep. 20, 2012, provisional application No. 61/812,220, filed on Apr. 15, 2013.

(51) Int. Cl.
*H04W 72/04* (2009.01)
*H04W 72/12* (2009.01)
(Continued)

(52) U.S. Cl.
CPC .......... *H04W 72/0413* (2013.01); *H04B 7/06* (2013.01); *H04L 5/001* (2013.01);
(Continued)

(58) Field of Classification Search
CPC ....... H04B 7/06; H04L 27/2601; H04L 5/001; H04L 5/0048; H04L 5/0055;
(Continued)

(56) References Cited

U.S. PATENT DOCUMENTS

2010/0251054 A1   9/2010   Cai et al.
2011/0105107 A1*  5/2011   Kwon .................. H04W 28/06
                                              455/422.1
(Continued)

FOREIGN PATENT DOCUMENTS

CN    201550284 U   8/2010
CN    101868992 A   10/2010
(Continued)

OTHER PUBLICATIONS

Panasonic, "Views on TDD inter-band CA with different UL-DL configurations", 3GPP TSG-RAN WG1 Meeting #67, R1-113803, San Francisco, USA, Nov. 14-18, 2011, pp. 1-4.
(Continued)

*Primary Examiner* — Benjamin Lamont
*Assistant Examiner* — Nizam U Ahmed
(74) *Attorney, Agent, or Firm* — Birch, Stewart, Kolasch & Birch, LLP

(57) ABSTRACT

A method for and apparatus for transmitting uplink transmission in a wireless communication system supporting multiple carriers is provided. A wireless device transmits the uplink transmission via an alternative Primary serving cell or Secondary serving cell in uplink between the UE and the eNB. Herein the uplink transmission is configured by enabling information with corresponding serving cell as the
(Continued)

Primary serving cell or the Secondary serving cell for the uplink transmission. And then, a PUCCH and/or PUSCH can performed on the enabling serving cell and/or cells in consideration of power control more accurately and efficiently.

12 Claims, 5 Drawing Sheets

(51) Int. Cl.
    *H04L 5/00*       (2006.01)
    *H04B 7/06*       (2006.01)
    *H04L 5/14*       (2006.01)
    *H04L 27/26*     (2006.01)
    *H04W 74/08*    (2009.01)

(52) U.S. Cl.
    CPC .......... *H04L 5/0048* (2013.01); *H04L 5/0055* (2013.01); *H04L 5/14* (2013.01); *H04L 27/2601* (2013.01); *H04W 72/0446* (2013.01); *H04W 72/1289* (2013.01); *H04W 74/0833* (2013.01); *H04L 5/0098* (2013.01); *H04W 72/1263* (2013.01); *Y02D 70/00* (2018.01); *Y02D 70/1242* (2018.01); *Y02D 70/1262* (2018.01); *Y02D 70/1264* (2018.01); *Y02D 70/23* (2018.01)

(58) Field of Classification Search
    CPC .... H04L 5/0098; H04L 5/14; H04W 72/0413; H04W 72/0446; H04W 72/1263; H04W 72/1289; H04W 74/0833
    USPC ....................................................... 370/280
    See application file for complete search history.

(56) References Cited

U.S. PATENT DOCUMENTS

| | | | | |
|---|---|---|---|---|
| 2012/0120817 | A1* | 5/2012 | Khoshnevis | H04L 1/0026 370/252 |
| 2013/0003573 | A1* | 1/2013 | Reznik | H04W 16/14 370/252 |
| 2013/0182687 | A1* | 7/2013 | Ng | H04W 56/0015 370/336 |
| 2014/0050113 | A1* | 2/2014 | Rosa | H04W 52/0229 370/252 |
| 2014/0286240 | A1* | 9/2014 | Kim | H04W 56/0005 370/328 |

FOREIGN PATENT DOCUMENTS

| | | | |
|---|---|---|---|
| CN | 102318411 A | 1/2012 | |
| CN | 102668412 A | 9/2012 | |
| CN | 102668672 A | 9/2012 | |
| EP | 2 360 865 A1 | 8/2011 | |
| EP | 2360865 A1 * | 8/2011 | ............ H04L 5/001 |
| WO | WO 2011/116365 A2 | 9/2011 | |

OTHER PUBLICATIONS

Qualcomm Incorporated, "Clarification of parallel PUCCH and PUSCH transmission", 3GPP TSG-RAN WG1 #65, R1-111676, Barcelona, Spain, May 9-13, 2011, pp. 1-2.

* cited by examiner

[Fig. 1]
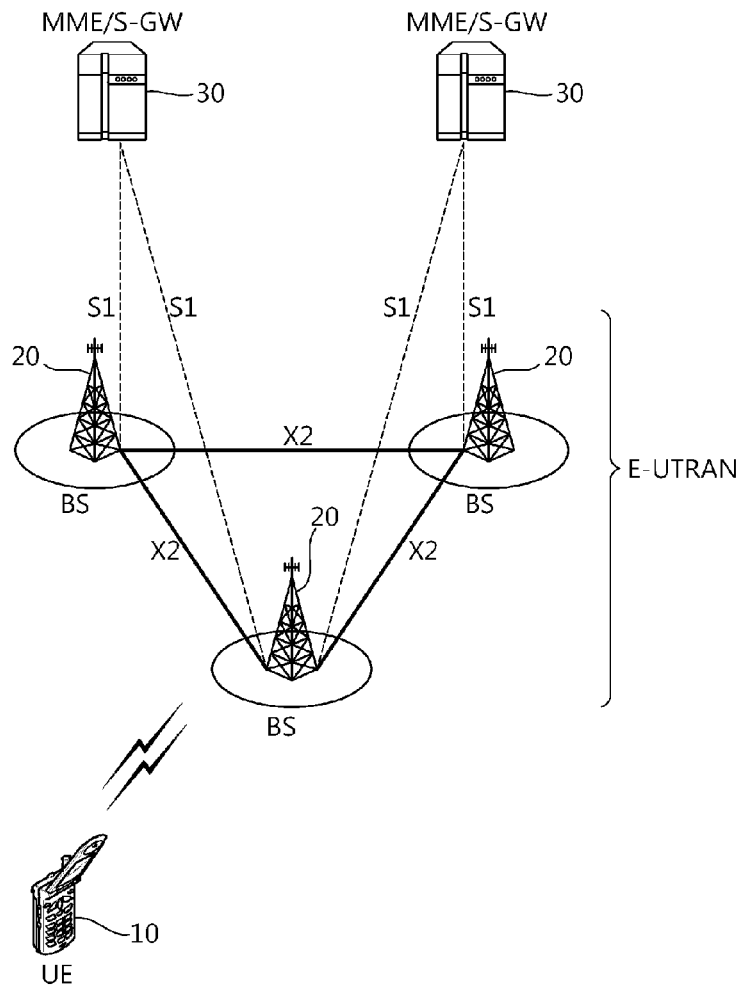
[Fig. 2]
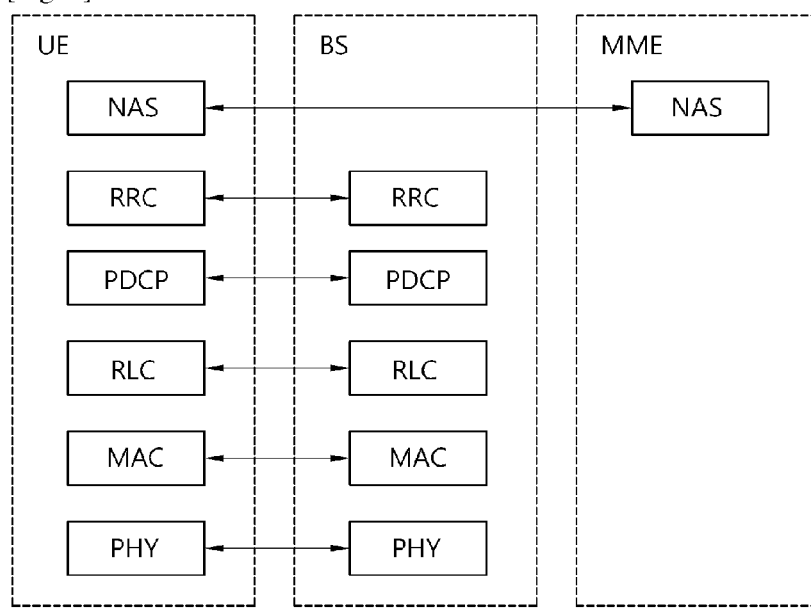

[Fig. 3]
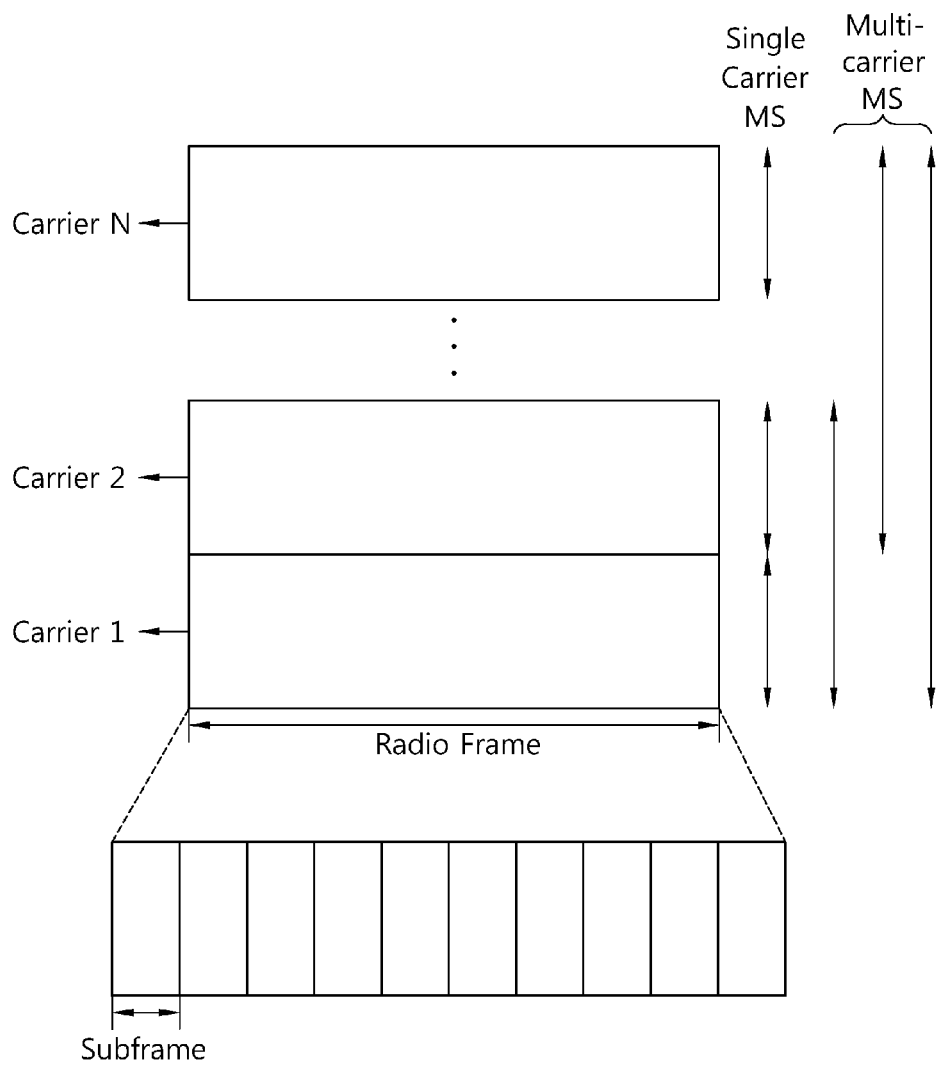
[Fig. 4]
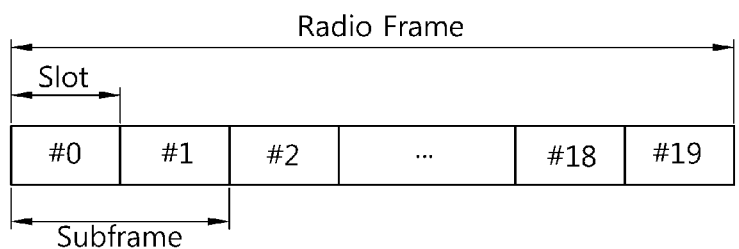

[Fig. 5]
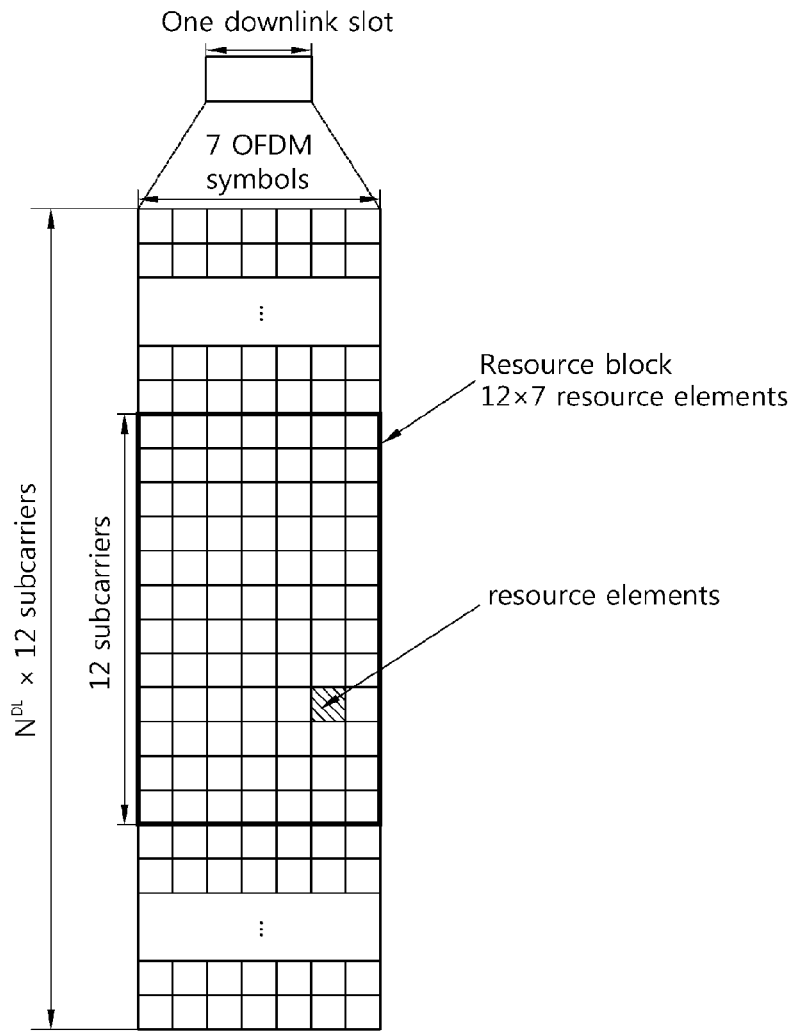
[Fig. 6]
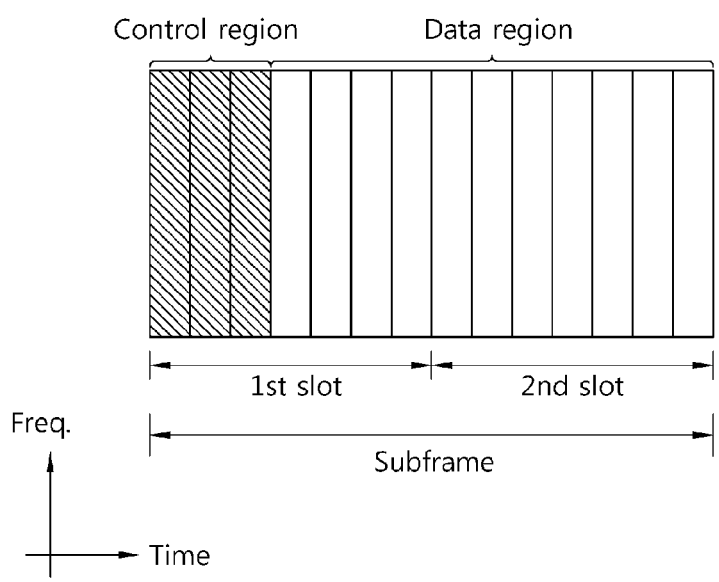

[Fig. 7]
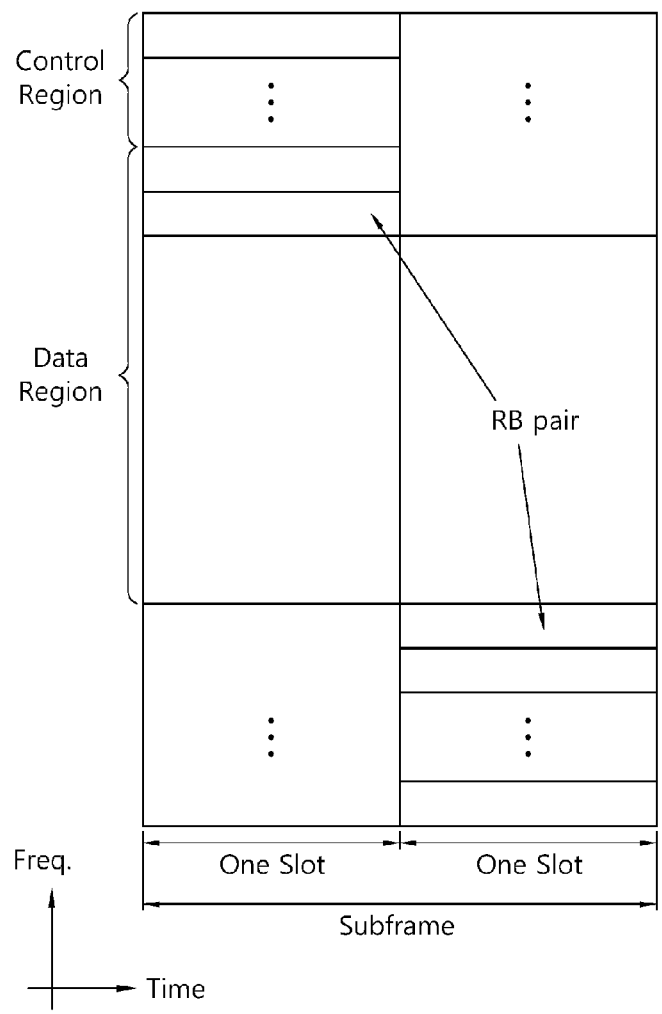
[Fig. 8]
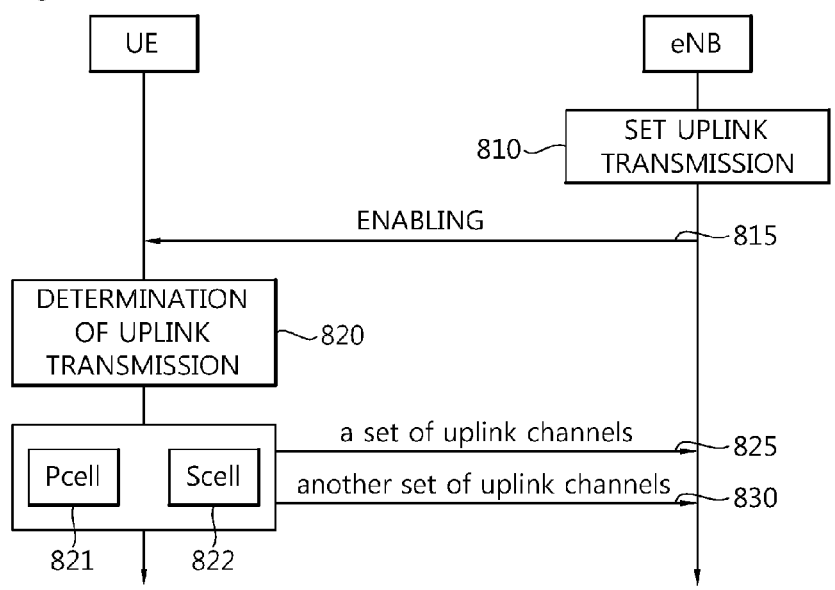

[Fig. 9]
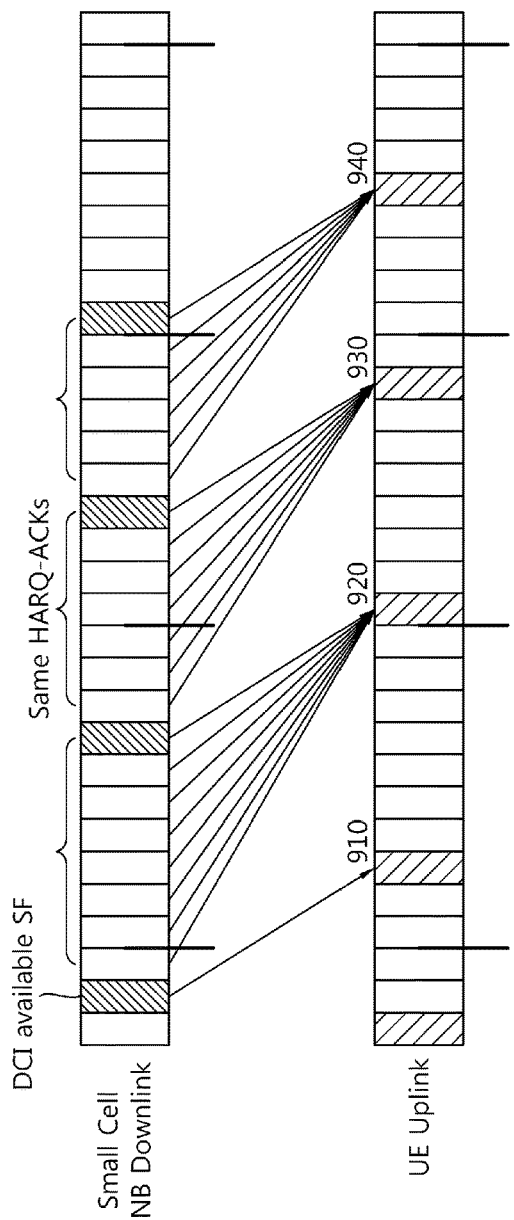
[Fig. 10]
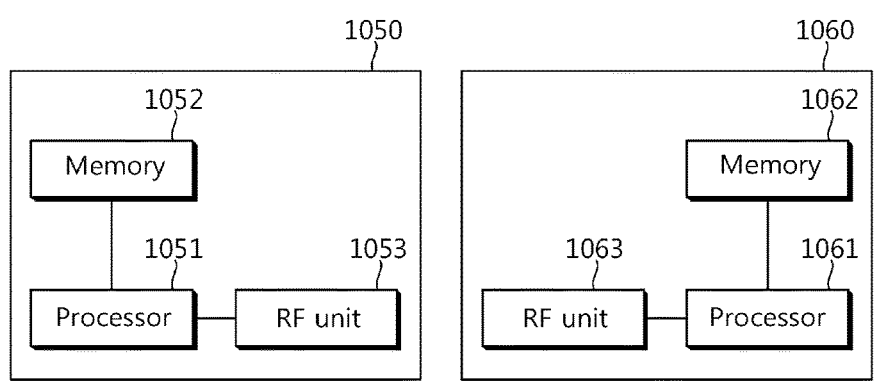

METHOD AND APPARATUS FOR PERFORMING UPLINK TRANSMISSION IN A WIRELESS COMMUNICATION SYSTEM

CROSS REFERENCE TO RELATED APPLICATIONS

This application is the National Phase of PCT International Application No. PCT/KR2013/008400, filed on Sep. 17, 2013, which claims priority under 35 U.S.C. 119(e) to U.S. Provisional Application No. 61/703,287, filed on Sep. 20, 2012, and to U.S. Provisional Application No. 61/812,220, filed on Apr. 15, 2013, all of which are hereby expressly incorporated by reference into the present application.

TECHNICAL FIELD

The present invention relates to wireless communications, and more particularly, to a method and apparatus for transmitting uplink transmission in a wireless communication system supporting multiple carriers.

BACKGROUND ART

3rd generation partnership project (3GPP) long term evolution (LTE) is an improved version of a universal mobile telecommunication system (UMTS) and a 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) that is an evolution of the 3GPP LTE.

The commercialization of the 3GPP LTE (A) system is being recently accelerated. The LTE systems are spread more quickly as respond to users demand for services that may support higher quality and higher capacity while ensuring mobility, as well as voice services. The LTE system provides for low transmission delay, high transmission rate and system capacity, and enhanced coverage.

To increase the capacity for the users' demand of services, increasing the bandwidth may be essential, a carrier aggregation (CA) technology aiming at obtaining an effect, as if a logically wider band is used, by grouping a plurality of physically non-continuous bands in a frequency domain has been developed to effectively use fragmented small bands. Individual unit carriers grouped by carrier aggregation is known as a component carrier (CC). Each CC is defined by a single bandwidth and a center frequency.

A system in which data is transmitted and/or received in a broadband through a plurality of CCs is referred to as a multi-component carrier system (multi-CC system) or a CA environment. The multi-component carrier system performs both a narrow band and a broad band by using one or more carriers. For example, when an each carrier corresponds to a bandwidth of 20 MHz, a bandwidth of a maximum of 100 MHz may be supported by using five carriers.

In order to operate the multi-CC system, various control signals are required between a base station (BS) as an eNB (enhanced Node B) and a User equipment as a Terminal. For example, exchanging ACK (Acknowledgement)/NACK (Non-Acknowledgement) information for performing HARQ (Hybrid Automatic Repeat reQuest), controlling power of the HARQ, and the like, are required.

DISCLOSURE OF INVENTION

Technical Problem

The present invention provides a method and apparatus for performing uplink transmission in a wireless communication system supporting multiple carriers.

The present invention also provides a method and apparatus for transmitting uplink transmission via an alternative Primary serving cell or Secondary serving cell in a wireless communication system supporting multiple carriers.

Solution to Problem

In an aspect, a method for transmitting uplink transmission in a wireless communication system supporting multiple carriers is provided. The method may include receiving enabling information for the uplink transmission, transmitting a set of uplink channels via a first serving cell based on the enabling information, and transmitting another set of uplink channels via the first serving cell or a second serving cell based on the enabling information; wherein the first serving cell or the second serving cell for the uplink transmission is changed alternatively based on the enabling information, and the set of uplink channels each includes at least one of a physical uplink control channel (PUCCH) and a physical uplink shared channel (PUSCH).

The method may further include configuring the PUCCH and the PUSCH via an each serving cell separately, wherein, the PUCCH is transmitted via a primary serving cell (PCell) as the first serving cell and the PUSCH is transmitted via the first serving cell or a secondary serving cell (SCell) as the second serving cell, based on the enabling information.

The method may further include transmitting the PUCCH or the PUSCH using a reference configuration of the first serving cell or the second serving cell when a different Time Division Duplex (TDD) with two more serving cells is configured, wherein, a ACK/NACK for the first serving cell is transmitted by following the first serving cell configuration and a ACK/NACK for the second serving cell is transmitted by following the second serving cell.

In another aspect, a wireless device for transmitting uplink transmission in a wireless communication system supporting multiple carriers is provided. The wireless device includes a radio frequency unit for receiving a radio signal, and a processor, operatively coupled with the radio frequency unit, configured to: receive enabling information for the uplink transmission, transmit a set of uplink channels via a first serving cell and another set of uplink channels via the first serving cell or a second serving cell, based on the enabling information. Wherein the first serving cell or the second serving cell for the uplink transmission is changed alternatively based on the enabling information, and the set of uplink channels each includes at least one of a physical uplink control channel (PUCCH) and a physical uplink shared channel (PUSCH).

Advantageous Effects of Invention

This invention provides that the at least two serving cells with different coverage can be used for uplink transmission, herein each serving cell can be controlled by an eNB for control or data extension. Especially, control information as an enabling to indicate a corresponding serving cell is transmitted via a corresponding serving cell, reference cell or, Pcell. Thus the uplink transmission between the UE and the eNB can be complied with accurately via an enabling serving cell. Herein the uplink transmission can be advantaged that PUCCH and/or PUSCH can performed on the enabling serving cell and/or cells in consideration of power control. Thus the reliability of the uplink transmission can be supported more accurately and efficiently.

BRIEF DESCRIPTION OF DRAWINGS

FIG. 1 is view illustrating a wireless communication system to which the present invention is applied.

FIG. 2 is a view illustrating an example of a protocol structure to which the present invention is applied.

FIG. 3 is a view illustrating an example of a frame structure for a multi-carrier operation to which the present invention is applied.

FIG. 4 shows the structure of a radio frame to which the present invention is applied.

FIG. 5 is an exemplary diagram showing a resource grid for one downlink slot to which the present invention is applied.

FIG. 6 shows the structure of a downlink subframe to which the present invention is applied.

FIG. 7 shows the structure of an uplink subframe carrying an ACK/NACK signal to which the present invention is applied.

FIG. 8 shows an exemplary concept for uplink Transmission according to an exemplary embodiment of the present invention.

FIG. 9 shows an exemplary time flow for uplink Transmission with uplink TDM according to an exemplary embodiment of the present invention.

FIG. 10 shows a block diagram showing a wireless communication system according to an exemplary embodiment of the present invention.

MODE FOR THE INVENTION

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The BS 20 is generally a fixed station that communicates with the UE 10 and may be referred to as another terminology, such as an evolved node-B (eNB), a base transceiver system (BTS), an access point, etc.

Multi-access schemes applied to the wireless communication system are not limited. Namely, various multi-access schemes such as CDMA Code Division Multiple Access), TDMA (Time Division Multiple Access), FDMA (Frequency Division Multiple Access), OFDMA (Orthogonal Frequency Division Multiple Access), SC-FDMA (Single Carrier-FDMA), OFDM-FDMA, OFDM-TDMA, OFDM-CDMA, or the like, may be used. For uplink transmission and downlink transmission, a TDD (Time Division Duplex) scheme in which transmission is made by using a different time or an FDD (Frequency Division Duplex) scheme in which transmission is made by using different frequencies may be used.

The BSs 20 are interconnected by means of an X2 interface. The BSs 20 are also connected by means of an S1 interface to an evolved packet core (EPC) 30, more specifically, to a mobility management entity (MME) through S1-MME and to a serving gateway (S-GW) through S1-U.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 2 is a diagram showing a radio protocol architecture for a user plane and a control plane. The user plane is a protocol stack for user data transmission. The control plane is a protocol stack for control signal transmission with RRC and NAS layers.

Referring to FIG. 2, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data are transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

Functions of the RLC layer include RLC SDU concatenation, segmentation, and re-assembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH) or optionally added an Enhanced PDCCH (EPDDCH), i.e., an L1/L2 control channel.

FIG. 3 is a view illustrating an example of a frame structure for a multi-carrier operation to which the present invention is applied. This invention can be also applied that the aggregated CCs are not aligned at subframe as synchronization.

Referring to FIG. 3, a UE may support one or more carriers (Carrier 1 or more Carriers 2 . . . N) according to UE's capability thereof. Multiple carriers may be adjacent to each other or may not.

Component carriers may be divided into a primary component carrier (PCC) and a secondary component carrier (SCC) depending on whether or not they are activated. A PCC is a carrier which is constantly activated, and an SCC is a carrier which is activated or deactivated according to particular conditions. Here, activation refers to a state in which traffic data is transmitted or received or a state in which traffic data is ready to be transmitted or received. Deactivation refers to a state in which traffic data cannot be transmitted or received and measurement or transmission or reception of minimum information is available.

Furthermore, the PCC can be also activated or deactivated using an indication of Activation/Deactivation as a bit. The UE can camp on the Pcell at first in initial access. The UE may use only one primary component carrier or one or more secondary component carriers along with a primary component carrier. The UE may be allocated a primary component carrier and/or a secondary component carrier from the BS.

A PCC is a carrier by which primary control information items are exchanged between a BS and an UE. An SCC is a carrier allocated according to a request from an UE or an instruction from a BS. A PCC may be used for an UE to enter a network and/or may be used to allocate an SCC. A PCC may be selected from among entire set carriers, rather than being fixed to a particular carrier. A carrier set as an SCC may also be changed into a PCC.

As described above, a DL CC may construct one serving cell, and the DL CC and a UL CC may construct one serving cell by being linked with each other. Further, a primary serving cell (PCell) corresponds to a PCC, and a secondary serving cell (SCell) corresponds to an SCC. Each carrier and combination of carriers may also be referred to as each one serving cell as a PCell or a SCell. That is, the one serving cell may correspond to only one DL CC, or may correspond to both the DL CC and the UL CC.

A Pcell is a resource in which the UE initially establishes a connection (or RRC connection) among several cells. The Pcell serves as a connection (or RRC connection) for signaling with respect to a plurality of cells (CCs), and is a special CC for managing UE context which is connection information related to the UE. Further, when the Pcell (PCC) establishes the connection with the UE and thus is in an RRC connected mode, the PCC always exists in an activation state. A SCell (SCC) is a resource assigned to the UE other than the Pcell (PCC). The SCell is an extended carrier for additional resource assignment, etc., in addition to the PCC, and can be divided into an activation state and a deactivation state. The SCell is initially in the deactivation state.

A MAC control element including an activation indicator has a length of 8 bits, is used for activation for each serving cell. Herein, a Pcell is implicitly regarded as being activated between the UE and the eNB and, thus the Pcell is not additionally included in the activation indicator. An index of the Pcell is always given a specific value, and it is assumed herein that the index is given 0. So the Scells are indexed with 1, 2, 3, 7 for a serving cell index 1 corresponds to a $7^{th}$ bit from the left, which are the remaining indices other than 0, i.e., the index of the Pcell. Herein, the index of the serving cell may be a logical index determined relatively for each UE, or may be a physical index for indicating a cell of a specific frequency band.

FIG. 4 shows the structure of a radio frame to which the present invention is applied.

Referring to FIG. 4, a radio frame includes 10 subframes, and one subframe includes two slots. The time taken for one subframe to be transmitted is called a Transmission Time Interval (TTI). For example, the length of one subframe may be 1 ms, and the length of one slot may be 0.5 ms.

One slot includes a plurality of OFDM symbols in the time domain and includes a plurality of Resource Blocks (RBs) in the frequency domain. An OFDM symbol is for representing one symbol period because downlink OFDMA is used in 3GPP LTE and may be called an SC-FDMA symbol or a symbol period depending on a multi-access scheme. An RB is a resource allocation unit, and it includes a plurality of contiguous subcarriers in one slot.

The structure of the radio frame is only illustrative, and the number of subframes included in a radio frame or the number of slots included in a subframe and the number of OFDM symbols included in a slot may be changed in various ways.

In relation to resource allocation, a physical resource structure is first described.

FIG. 5 is an exemplary diagram showing a resource grid for one downlink slot to which the present invention is applied.

Referring to FIG. 5, the downlink slot includes a plurality of OFDM symbols in the time domain. Here, one downlink slot is illustrated as including 7 OFDMA symbols and one Resource Block (RB) is illustrated as including 12 subcarriers in the frequency domain, but not limited thereto.

Each element on the resource grid is called a Resource Element (RE). One resource block includes 12×7 REs. The number $N^{DL}$ of resource blocks included in a downlink slot depends on a downlink transmission bandwidth that is set in a cell. Bandwidths that are taken into account in LTE are 1.4 MHz, 3 MHz, 5 MHz, 10 MHz, 15 MHz, and 20 MHz. If the bandwidths are represented by the number of resource blocks, they are 6, 15, 25, 50, 75, and 100, respectively. One or more resource blocks corresponding to each band may be combined to form a Resource Block Group (RBG). For example, two contiguous resource blocks may form one resource block group.

In LTE, the total number of resource blocks for each bandwidth and the number of resource blocks that form one resource block group are shown in Table 1.

TABLE 1

| Bandwidth | Total number of RBs | Number of RBs belonging to one RBG | Total number of RBGs |
|---|---|---|---|
| 1.4 MHz | 6 | 1 | 6 |
| 3 MHz | 15 | 2 | 8 |
| 5 MHz | 25 | 2 | 13 |
| 10 MHz | 50 | 3 | 17 |
| 15 MHz | 75 | 4 | 19 |
| 20 MHz | 100 | 4 | 25 |

Referring to Table 1, the total number of available resource blocks is different depending on a given bandwidth. What the total number of resource blocks differs means that the size of information indicative of resource allocation is different.

FIG. 6 shows the structure of a downlink subframe to which the present invention is applied.

Referring to FIG. 6, a subframe includes two slots. The former 0 or 1 or 2 or 3 OFDM symbols of the first slot within the subframe correspond to a control region to which a PDCCH is allocated, and the remaining OFDM symbols thereof become a data region to which a PDSCH is allocated.

When 0 OFDM symbols of the first slot within the subframe is used for control region, an enhanced PDCCH (EPDCCH) can be placed in data region which conveys control information. Note that even with PDCCH, enhanced PDCCH (EPDCCH) can be placed in a data region in this invention.

Downlink control channels include a Physical Control Format Indicator Channel (PCFICH), a Physical Downlink Control Channel (PDCCH)/EPDCCH, and a Physical Hybrid-ARQ Indicator Channel (PHICH)/EPHICH.

The PCFICH transmitted in a 1st OFDM symbol of the subframe carries a control format indicator (CFI) regarding the number of OFDM symbols (i.e., size of the control region) used for transmission of control channels in the subframe, that is, carries information regarding the number of OFDM symbols used for transmission of control channels within the subframe. The UE first receives the CFI on the PCFICH, and thereafter monitors the PDCCH/EPDCCH.

The PHICH/EPHICH carries acknowledgement (ACK)/not-acknowledgement (NACK) signals in response to an uplink Hybrid Automatic Repeat Request (HARQ). That is, ACK/NACK signals for uplink data that has been transmitted by a UE are transmitted on a PHICH.

A PDCCH/EPDCCH, that is, a downlink physical channel, is described below.

A PDCCH can carry information about the resource allocation and transmission format of a Downlink Shared Channel (DL-SCH), information about the resource allocation of an Uplink Shared Channel (UL-SCH), paging information about a Paging Channel (PCH), system information on a DL-SCH, information about the resource allocation of a higher layer control message, such as a random access response transmitted on a PDSCH, a set of transmit power control commands for UEs within a certain UE group, the activation of a Voice over Internet Protocol (VoIP), etc. A plurality of PDCCH/EPDCCHs may be transmitted within the control region, and a UE can monitor a plurality of PDCCH/EPDCCHs. PDCCH/EPDCCHs are transmitted on one Control Channel Element (CCE)/ECCE or on an aggregation of some contiguous CCEs. A CCE/ECCE is a logical assignment unit for providing a coding rate according to the state of a radio channel to a PDCCH/EPDCCH. A CCE/ECCE corresponds to a plurality of resource element groups (REGs). The format of a PDCCH/EPDCCH and the number of possible bits of a PDCCH/EPDCCH are determined by a correlation between the number of CCE/ECCEs and a coding rate provided by CCE/ECCEs.

Control information transmitted through a PDCCH/EPDCCH is called Downlink Control Information (hereinafter referred to as DCI). The DCI includes uplink or downlink scheduling information or includes an uplink transmit (Tx) power control command for arbitrary UE groups. The DCI is differently used depending on its format, and it also has a different field that is defined within the DCI. Table 2 shows DCI according to a DCI format.

TABLE 2

| DCI format | Description |
|---|---|
| 0 | Used for the scheduling of a PUSCH (uplink grant) |
| 1 | Used for the scheduling of one PDSCH codeword |
| 1A | Used for the simplified scheduling of one PDSCH codeword and for a random access procedure reset by a PDCCH command |
| 1B | Used for the simplified scheduling of one PDSCH codeword using precoding information |
| 1C | Used for the simplified scheduling of one PDSCH codeword and the notification of a change of an MCCH |
| 1D | Used for precoding and the simplified scheduling of one PDSCH codeword including power offset information |
| 2 | Used for PDSCH scheduling for a UE configured in spatial multiplexing mode |
| 2A | Used for the PDSCH scheduling of a UE configured in large delay CDD mode |
| 2B | Used for Resource assignments for PDSCH using up to 2 antenna ports with UE-specific reference signals |
| 2C | Used for Resource assignment for PDSCH using up to 8 antenna ports with UE-specific reference signals |
| 2D | Used for Resource assignment for PDSCH using up to 8 antenna ports with UE-specific reference signals |
| 3 | Used for the transmission of a TPC command for a PUCCH and PUSCH including 2-bit power coordination |

TABLE 2-continued

| DCI format | Description |
|---|---|
| 3A | Used for the transmission of a TPC command for a PUCCH and PUSCH including single bit power coordination |

The DCI Format 0 indicates uplink resource allocation information, the DCI formats 1~2 indicate downlink resource allocation information, and the DCI formats 3 and 3A indicate uplink Transmit Power Control (TPC) commands for specific UE groups. The fields of the DCI are sequentially mapped to an information bit. For example, assuming that DCI is mapped to an information bit having a length of a total of 44 bits, a resource allocation field may be mapped to a $10^{th}$ bit to $23^{rd}$ bit of the information bit.

The DCI may include resource allocation of the PDSCH (this is referred to as a downlink (DL) grant), resource allocation of a PUSCH (this is referred to as an uplink (UL) grant), a set of transmit power control commands for individual UEs in any UE group and/or activation of a voice over Internet protocol (VoIP).

Table 3 shows the DCI of Format 0, that is, uplink resource allocation information (or an uplink grant).

TABLE 3

Carrier indicator - 0 or 3 bits. - Flag for format0/format1 A differentiation - 1 bit, where value 0 indicates format 0 and value 1 indicates format 1A- Frequency hopping flag - 1 bit. This field is used for multi-cluster allocations as the MSB of the corresponding resource allocation if needed.- Resource block assignment and hopping resource allocation - $|\log_2(N_{RB}^{UL}(N_{RB}^{UL} + 1)/2)|$ bits - For PUSCH hopping (single cluster allocation only): - $N_{UL\_hop}$ MSB bits are used to obtain the $\tilde{n}_{PRB}(i)$value of -$(\log_2(N_{RB}^{UL}(N_{RB}^{UL} + 1)/2)|- N_{UL\_hop})$ bits provide the resource allocation of the first slot in the UL subframe- For non-hopping PUSCH with single-cluster allocation: -$(|\log2(N_{RB}^{UL}(N_{RB}^{UL} + 1)/2|)$ bits provide the resource allocation in the UL subframe - For non-hopping PUSCH with multi-cluster allocation: the resource allocation is obtained from the concatenation of the frequency hopping flag field and the resource block assignment and hopping resource allocation field- $\left[\log_2\left(\left(\frac{\lceil N_{RB}^{UL}/p + 1\rceil}{4}\right)\right)\right]$ bits provide the resource allocation in the UL subframe and where the value of P depends on the number of DL resource blocks - Modulation and coding scheme and redundancy version - 5 bits - New data indicator - 1 bit- TPC command for scheduled PUSCH - 2 bits - Cyclic shift for DM RS and OCC index - 3 bits - UL index - 2 bits (this field is present only for TDD operation with uplink-downlink configuration 0)- Downlink Assignment Index (DAI) - 2 bits (this field is present only for TDD operation with uplink-downlink configurations 1-6)- CQI request - 1 or 2 bits. The 2-bit field only applies to UEs that are configured with more than one DL cell and when the corresponding DCI is mapped onto the UE specific by C-RNTI search space - SRS request - 0 or 1 bit. This field can only be present in DCI formats scheduling PUSCH which are mapped onto the UE specific by C-RNTI search space. - Multi-cluster flag - 1 bit The flag is 1-bit information and is an indicator for distinguishing the DCI 0 and the DCI 1A from each other. The hopping flag is 1-bit information, and it indicates whether frequency hopping is applied or not when a UE performs uplink transmission. For example, when the hopping flag is 1, it indicates that frequency hopping is applied at the time of uplink transmission. When the hopping flag is 0, it indicates that frequency hopping is not applied at the time of uplink transmission. The resource block assignment and hopping resource allocation is also called a resource allocation field. The resource allocation field indicates the physical locations and amount of resources that are allocated to a UE. Although not shown in Table 3, an uplink grant includes redundant bits or padding bits for constantly maintaining the total number of bits. The DCI has several formats. Although DCI has control information of a different format, the length of bits can be identically controlled using the redundant bits. Thus, a UE can perform blind decoding smoothly.

For example, in Table 3, if the resource allocation field has 13 bits in a band of an FDD 20 MHz, an uplink grant has a total of 27 bits (except a CIF field and a CRC field). If the length of bits determined as the input of blind decoding is 28 bits, a BS makes the uplink grant the total number of 28 bits by adding the redundant bits of 1 bit to the uplink grant at the time of scheduling. Here, all the redundant bits may be set to 0 because they do not include special information. Of course, the number of redundant bits may be smaller than or greater than 2.

The wireless communication system as 3GPP LTE of the present invention uses blind decoding for PDCCH/EPDCCH detection. The blind decoding is a scheme in which a desired identifier is de-masked from a CRC of a PDCCH/EPDCCH (referred to as a candidate PDCCH/EPDCCH) to determine whether the PDCCH/EPDCCH is its own channel by performing CRC error checking.

An eNB determines a PDCCH/EPDCCH format according to DCI to be transmitted to a UE. Thereafter, the eNB attaches a cyclic redundancy check (CRC) to the DCI, and masks a unique identifier (referred to as a radio network temporary identifier (RNTI)) to the CRC according to an owner or usage of the PDCCH/EPDCCH.

FIG. 7 is a view illustrating an example of a structure of an uplink subframe carrying an ACK/NACK signal to which the present invention is applied.

Referring to FIG. 7, an uplink subframe may be divided into a control region to which a physical uplink control channel (PUCCH) that carries uplink control information is allocated, herein; the control information includes an ACK/NACK response of downlink transmission. A data region to which physical uplink shared channel (PUSCH) that carries user data is allocated in the frequency domain.

To maintain a single-carrier property, one UE may not simultaneously transmit the PUCCH and the PUSCH. However, if a UE is capable of simultaneous PUCCH/PUSCH transmissions, it is also feasible for one UE to transmit PUCCH and PUSCH at the same subframe. In the subframe, pair of RBs is allocated to the PUCCH with respect to one UE, and the allocated resource block (RB) pair are resource blocks corresponding to different subcarriers in each of two slots. This is called that the RB pair allocated to the PUCCH are frequency-hopped at a slot boundary.

The PUCCH may support multiple formats. Namely, it can transmit uplink control information having different number of bits per subframe according to a modulation scheme. PUCCH format 1 is used to transmit a scheduling request (SR), and PUCCH formats 1a and 1b are used to transmit an HARQ ACK/NACK signal. PUCCH format 2 is used to transmit a CQI, and PUCCH formats 2a and 2b are used to transmit a CQI and a HARQ ACK/NACK. When an HARQ ACK/NACK is transmitted alone, PUCCH formats 1a and 1b are used, and when an SR is transmitted alone, PUCCH format 1 is used. And PUCCH format 3 may be used for the TDD system.

Meanwhile, there is a desire to enable only one uplink transmission at one time due to the UE complexity even more than 2CCs are aggregated. The benefits of enabling only one link include (1) efficient uplink power control (e.g., transmitting uplink signals with lower power consumption) (2) load balancing of uplink resources (e.g., selecting uplink with lower load or higher reliability) (3) offload of macro PCell uplink (e.g., if PCell is TDD carrier, limited uplink resources can be addressed by SCell uplink especially effective when SCell is FDD carrier).

To support simultaneous uplink transmissions to more than two carriers at one subframe would require higher complexity at the UE side. Furthermore, one UE also needs to handle potential power imbalance between 2 or more CCs. Power imbalance issue refers that a UE's hardware may not handle 2 or more simultaneous uplink transmissions where the power difference between different transmissions exceeds a certain threshold.

This invention can include that the transmission of control information (such as A/N, SR, PRACH, CSI, SRS) and data transmission in uplink may be supported by enabling one uplink serving cell which will be discussed in below with a few methods are available.

FIG. 8 shows an exemplary operation process of the uplink transmission between UE and the eNB according to the present invention.

Referring to FIG. 8, the eNB sets configurations for the uplink transmission (810). The eNB enables a one serving cell to transmit uplink to UE (815). Herein, the enabling the one serving cell for uplink transmission can include an alternative selection of Pcell and Scell to perform uplink.

The UE determines that a serving cell indicated by eNB is for the uplink (820). That is, the UE determines that the enabling the one serving cell for uplink is one of;

(1) SIB indication on PCell uplink: by separating uplink and downlink linkage, SIB can assign PCell downlink and uplink separately (static method).

(2) RRC signaling to change the uplink: semi-statically, uplink can be changed via higher-layer signaling.

(3) MAC CE change: by separating uplink and downlink linkage, uplink CC and downlink CC may be activated and deactivated separately. By deactivating PCell uplink and activating SCell uplink (when 2 CCs are aggregated), UE may change its uplink to SCell uplink from PCell uplink.

(4) Paging to change the uplink: semi-statically, uplink can be changed via paging.

(5) RACH to change the uplink: semi-statically, UE may assume that PDCCH order is used for requesting to change the uplink. In other words, when a UE receives PDCCH order on SCell uplink, it assumes that SCell uplink is used for uplink transmission once RACH process completes successfully. To switch from SCell to PCell, PDCCH order can be used as well.

(6) Per scheduling: by default, UE assume that uplink transmission occurs via PCell uplink. To change the uplink resource, eNB transmits DCI with the target uplink. For example, CIF field in DCI may be used for indicating the uplink CC assuming eNB is allowed to perform self-scheduling only and cross-carrier scheduling is not allowed. For uplink grant with CIF indicates the PUSCH CC and PDSCH scheduling DCI with CFI indicates the A/N CC.

When the UE checks that the enabling uplink transmission cell, the UE can transmit the ACK/NACK of the response of the enabling indication via a selected serving cell. The UE transmits uplink transmission via alternative SCell or PCell (825).

Here, assuming C-Plane and U-Plane are split over PCell and SCell, cross-carrier scheduling between C-Plane and U-Plane is not allowed. Thus, CIF field in this scenario may be reused for some other purpose or not used (e.g., method (6)). When method (6) is used, UE may assume that PUSCH on both PCell and SCell are not scheduled simultaneously. Otherwise, UE may assume PCell PUSCH has higher priority so that SCell PUSCH is dropped if it collides with PCell PUSCH or vice versa.

This invention includes that uplink for PUCCH (or PRACH) and PUSCH can be configured separately. In other words, PUCCH may be transmitted via PCell while PUSCH may be transmitted via SCell (or vice versa) (830).

Furthermore, uplink for SR, SRS, PRACH, UCI and PUSCH can be configured separately where a set of signals are transmitted via PCell while the other signals may be transmitted via SCell (or vice versa). Without loss of generality, we present the invention using PUCCH and PUSCH as an example hereafter.

More details, When the UE receives a enabling information for the uplink transmission from the eNB, the UE can transmit a set of uplink channels via a first serving cell based on the enabling information, another set of uplink channels via the first serving cell or a second serving cell based on the enabling information with alternatively, or optionally if the UE is capable for 2 more CCs it can transmit the set of uplink channels simultaneously.

Herein the first serving cell or the second serving cell for the uplink transmission is changed alternatively based on the enabling information, and the set of uplink channels each includes at least one of a physical uplink control channel (PUCCH) and a physical uplink shared channel (PUSCH) in this invention. The PUCCH and the PUSCH are configured via an each serving cell separately, the PUCCH is transmitted via a primary serving cell (PCell) as the first serving cell and the PUSCH is transmitted via the first serving cell or a secondary serving cell (SCell) as the second serving cell, based on the enabling information (or vice versa).

In this invention also include that physical random access channel (PRACH) transmission timing to enable only one uplink CC at one subframe is dynamically changed, wherein, the PRACH is scheduled to be transmitted via one cell and transmitting the other uplink signals is scheduled to be transmitted via another cell at one subframe. In addition to, the UE may also transmit the PUCCH or the PUSCH using a reference configuration of the first serving cell or the second serving cell when a different Time Division Duplex (TDD) with two more serving cells is configured, wherein, a ACK/NACK for the first serving cell is transmitted by following the first serving cell configuration and a ACK/NACK for the second serving cell is transmitted by following the second serving cell.

Using method (6), when PUSCH and PUCCH are colliding and configured to be transmitted at different CCs, in intra-CA case, PUCCH is dropped and A/N & CSI will be piggybacked on PUSCH. In inter-CA case, PCell has higher priority or PUCCH has higher priority or PUSCH has higher priority or U-Plane has higher-priority.

In this invention, the UE can also confirm Power Control for the different CCs. Assuming PUCCH and PUSCH can be configured to different CC e.g., PUCCH via SCell and PUSCH via PCell, there are a few approaches considered in terms of power control for PUSCH, PUCCH and SRS.

(1) Uplink power control associated with downlink CC (linked): Power control for either PUSCH or PUCCH is dependent only on TPC from its linked downlink CC. Assuming self-scheduling, PCell PDSCH scheduling DCI or PCell uplink grant DCI will adapt power for uplink channel configured for PCell uplink and the same thing applies to the SCell as well. For example, PUCCH is configured to PCell UL and PUSCH is configured to SCell UL, TPC sent by PCell adapts PUCCH power and TPC sent by SCell adapt PUSCH power. If cross-carrier scheduling is used, scheduled cell becomes a reference (e.g., SCell uplink grant scheduled by PCell adapts PUSCH power on SCell uplink). Note that power control for PUSCH is same as to Rel-10 rule. This approach does not lead any RRC ambiguity issue, yet, efficiency may be degraded for example only one CC is used for uplink transmission where power control for unused CC is not necessary.

(2) Following Rel-10 rule: as in Rel-10 specification, TPC is used for PCell PUCCH and PCell/SCell PUSCH. When PUCCH CC is changed to SCell UL, either random access procedure is initiated to configure initial power or TPC command can be transmitted to configure initial power for SCell PUCCH.

This invention includes that the UE can perform Random Access Procedure as only one uplink is available at one time, herein, the handling RACH may have a few options to consider.

(1) PDCCH Order Initiated by PCell only using CIF: to avoid collision between RACH and other uplink channel, PDCCH order may be limited only to PCell or one cell if the uplink is configured to UL CC linked to the cell downlink. To schedule RACH on another cell (different from PDCCH order initiating cell), CIF on PDCCH Order can be utilized.

(2) Follow Rel-11 Behavior: this will allow independent RACH from PCell and SCells separately. When RACH and other uplink channel collide at different CC (e.g., RACH on PCell and PUCCH on SCell), UE may assume that when (P)RACH is initiated on a cell, uplink transmission CC will be automatically changed (to PCell in the example). Furthermore, UE may be configured to determine whether any uplink channel will be dropped or not when it collides with RACH. The same technique applies to the case where RACH is transmitted via PCell (when carrier aggregation is configured) as well.

(3) Relaxed RACH timing (initiated by PDCCH Order): another approach is to relax RACH timing so that any available uplink after 6 msec (once PDCCH order is received) without colliding with any uplink channel is used for RACH transmission. For example, PDCCH order is received at n-th subframe, and n+6-th and n+7th subframe are scheduled for PUCCH and PUSCH respectively, then RACH may be transmitted at n+8th subframe if n+8th subframe offers available PRACH resource.

More specifically, collision avoidance would be considered only for the case where the other uplink channel and RACH would be transmitted by different uplink carrier. For example, PUSCH is transmitted via PCell UL and RACH is transmitted via SCell UL, then it would be considered as a collision case. However, if PUSCH is transmitted via SCell UL and RACH would be scheduled for SCell UL as well, PUSCH would be dropped or it is considered as a misconfiguration. Herein the RACH can be called PRACH in this invention, the RACH and PRACH are same, and different to call based on the applied layer.

(4) RACH timing indication at PDCCH order: another approach is to assign "delay offset" via PDCCH order DCI such that UE shall transmit RACH at n+k+delay offset for PDCCH order received at n-th subframe where k>=6 and delay offset is transmitted via PDCCH order.

In addition to, SRS Configuration in this invention can be performed as below. If more than one CCs are used for uplink transmissions, both CCs may require receiving SRS. In terms of SRS configuration, the followings are feasible:

(1) SRS configuration: SRS can be configured per each CC regardless of uplink transmission (PUCCH or PUCCH is configured to a CC). SRS configured to the CC (not used for uplink transmission) is transmitted only when there is no colliding uplink channel. It follows Rel-10. For example, if PUCCH and PUSCH are configured to be transmitted via SCell and PCell SRS collide with SCell SRS/PUCCH/PUSCH, PCell SRS is dropped. Power control for SRS of each CC may be dependent on TPC for PUSCH (if PUSCH is configured to the same CC as SRS is transmitted) and/or TPC for PUCCH (if PUCCH is configured to the same CC as SRS is transmitted). For example, if PUSCH is configured to PCell and PUCCH is configured to SCell, SRS power control is based on PUSCH power control for PCell and PUCCH for SCell accordingly.

(2) SRS configuration & Disable periodic SRS on unused CC: another approach is to allow SRS on unused uplink via aperiodic SRS request only. For example, if PCell is not used for any uplink channel, SRS on PCell can be triggered only by aperiodic request. Even though UE is configured with periodic SRS on PCell, it ignores periodic SRS configuration on PCell in this case. Power control for SRS may be based on PUCCH if SRS is for CC configured for PUCCH and based on PUSCH if SRS is for CC configured for PUSCH but not for PUCCH.

(3) Periodic SRS and PUCCH association: using this approach, only CC transmitting PUCCH can transmit periodic SRS. There will be only one periodic SRS configuration which will be used for CC transmitting PUCCH. CC configured for PUSCH may use aperiodic SRS for transmitting SRS. Power control for SRS will be based on TPC for PUCCH. Herein the SRS/CSI/UCI can transmit via the only CC transmitting PUCCH.

(4) Periodic SRS and PUSCH association: similar to (3), SRS and PUSCH can be associated. In this case, power control for SRS will be based on TPC for PUSCH. Herein the Periodic SRS/CSI/UCI can transmit via the only CC transmitting PUSCH.

More details, CSI Configuration in this invention can include that periodic CSI configuration, similar approaches to SRS configuration can be used. In terms of disabling periodic SRS and/or CSI, a separate signaling to disable each SRS and CSI can be used or a signal may be used to disable both SRS and CSI.

And Channel on/off Configuration in this invention can include that an activated DL or UL CC, a separate configuration to turn on or off a signal can be considered. For example, a separate RRC signaling to turn on/off SRS transmission or turn on/off CSI transmission or turn on/off CSI-RS transmission or turn on/off CRS transmission or turn on/off DM-RS transmission or turn on/off PSS/SSS can be considered. Separate from configuration of each channel (for example, SRS configuration), this signal can be used to turn off the channel or enable the channel.

This invention also explains A/N timing issue in TDD at PUCCH CC change. When uplink CC for PUCCH is changed in TDD case, if configurations of PCell and SCells are the same, A/N timing may not cause any problem. Once a UE is received the re-configuration/change request (either by RRC, MAC CE, DCI), it follows the current A/N timing and only change the A/N resource for the new CC.

When a SCell uplink is used for uplink CC for PUCCH, a resource on the SCell for fallback operation shall be reserved via higher-layer signaling. For example, when PDSCHs are transmitted only from PCell, A/N using channel selection PUCCH Format 1b or single A/N using Format 1a will be transmitted via SCell resource rather than PCell resource. In other words, fall back operation is kept following the Rel-10 specification where the SCell uplink resource is used instead of PCell uplink resource. To support this, higher-layer configuration on single resource as well as four resources supporting PUCCH Format 3 shall be reserved in SCell when SCell is used for A/N transmission on TDD (also applicable to FDD).

At reconfiguration period, eNB may monitor both resources (old resource and new resource) of old uplink and new uplink CC. For PDSCHs using the same A/N resource, if dynamic CC change is supported via DCI, shall indicate the same CC for A/N or UE shall assume that same A/N resource is used for a bundled A/N.

In terms of different TDD case, multiple scenarios shall be considered.

(1) 2CC with different configuration: In terms of Rel-11 behavior, at different TDD, A/N timing for PCell follows PCell configuration and A/N timing for SCell follows a reference configuration where a reference configuration is a configuration containing the minimum number of downlink subframes which are union of PCell and SCell configuration. To support uplink CC change, a few options can be considered.

A. Always follow a reference configuration for both PCell and SCell: regardless of uplink CC, A/N timing may follow the reference configuration (minimum union of downlink subframes of both configurations)

B. Follow Rel-11 rule when PCell is used for PUCCH, follow the reference configuration (for both PCell and SCell) when SCell is used for PUCCH C. Follow Rel-11 rule when PCell is used for PUCCH, use the following rule when SCell is used for PUCCH
  i. SCell follows SCell timing
  ii. PCell follows the reference configuration of PCell and SCell If there are any downlink subframes which are not included in the new A/N timing, eNB assume those downlink subframes are not received successfully (i.e., NACKs occurred).

(2) More than 2CC: options are the same as to (1) case.
A. Always follow a reference configuration of PCell and SCells
B. Follow Rel-11 rule when PCell is used for PUCCH, follow the reference configuration when SCell is used for PUCCH if the new SCell configuration is different from PCell configuration, or follow Rel-11 rule otherwise.

C. Follow Rel-11 rule when PCell is used for PUCCH, use the following rule when a SCell is used for PUCCH
  i. The SCell follows the SCell s timing
  ii. PCell and other SCells follow the reference configuration where the reference configuration is the minimum union of downlink subframes of the SCell and PCell (for PCell) or the SCell and a SCell (for a SCell).

This invention also includes ARI Issue. When SCell is configured for A/N transmission, TPC on SCell PDSCH scheduling DCI may not be usable for A/N resource index (ARI). In this case, UE may assume that TPC on PCell PDSCH scheduling DCI is only TPC controlling PUCCH power and TPC on SCell PDSCH scheduling DCI is used as ARI or PCell PDSCH scheduling DCI is used for ARI instead. When the latter approach is used, it is desirable to switch downlink PCell when A/N CC is reconfigured if SIB linkage between DL and UL is kept. Alternatively, ARI is not used in this scenario.

If SIB configuration on DL and UL can be done separately, DL on PCell and UL on PCell would be linked regardless of band specification. In case of TDD PUCCH format 3 A/N with only PCell PDSCHs, ARI carried in PCell PDSCHs may be used for SCell A/N resource selection if SCell uplink is configured for PUCCH CC.

This invention also includes Intra-frequency CA UE with shared RF. When a UE shares the RF for multiple CCs (intra-frequency CCs) uplink, depending on the switch (from macro-cell uplink to small-cell uplink or vice versa), a gap may be required for frequency tuning. The gap may be configured to the first symbol of the uplink transmission after the switch or to the last symbol of the previous uplink transmission before switch if needed. Or, eNB may assign timing advance properly or handling scheduling accordingly so that there is no need of gap anytime. In this case, UE may assume no gap is required.

In this invention, the Multiple TA Issue can be also included. If multiple TAGs are configured for aggregated CCs or aggregated CCs are not aligned at subframe boundary-level, when uplink CC change occurs, there could be an overlap period where the uplink transmissions for the new uplink CC at subframe n+1 starts before subframe n uplink transmission. To handle this situation, the followings are feasible approaches:

1) Ignore the overlap portion from the subframe n transmission or subframe n+1 transmission (the last few symbols or the first few symbols).

2) Allow simultaneous transmissions where necessary power scaling down is applied if maximum power exceeds Pcmax.

3) Allow a gap subframe for every uplink CC change (which may be handled by eNB scheduler) so that UE does not transmit any consecutive uplink transmission at n+1 subframe when uplink CC is changed at n+1 subframe.

4) Make uplink CC change effective at subframe n+k where k>=4 and the smallest k (when uplink CC request is received at n subframe) where subframe n+k does not have any scheduled uplink.

Similar mechanisms are applicable to intra-frequency CA with shared RF UE as well.

When PUCCH CC and PUSCH CC are different and different TAG are configured for PUCCH CC and PUSCH CC, an overlap period between PUCCH and PUSCH may occur. If the overlap period is less than one OFDM symbol and SRS are not transmitted, shortened PUCCH or PUSCH (depending on the case) may be used to avoid simultaneous transmission at the overlap period. In other words, the last symbol of the first subframe on the overlap period can be dropped. When SRS is transmitted at the last symbol of the first subframe on the overlap period, either SRS is dropped or the first symbol of the second subframe on the overlap period is dropped or the whole second subframe is not transmitted or simultaneous transmissions are allowed with necessary power scaling or simultaneous transmission are allowed without any power scaling.

Further considerations on Inter-site CA are needed. When inter-site CA is configured to a UE and uplink change can be configured, the following issues should be addressed:

(1) Reconfiguration Ambiguity: the technique to address reconfiguration period (by eNB performing blind decoding on both uplink CC resources) may not be feasible in inter-site CA scenario.

A. Coordinate uplink CC change time between eNBs in advance so that each eNB knows when the change will become effective. At time, no change occurs, it can be considered as reconfiguration failure.

B. Informing of the change to eNB by UE: UE may inform other eNBs (other than eNB requested the uplink change) that it will change the uplink CC (2) PUSCH piggyback (A/N & CSI): when PUCCH CC and PUSCH CC are different in inter-site CA case, PUSCH piggybacking may not be allowed. Either UE assumes that once inter-site CA is configured, PUSCH piggybacking is not allowed or eNB may configure whether to enable or disable PUSCH piggybacking or PUSCH piggybacking is allowed regardless of uplink CC configuration.

Especially, HARQ-ACK timing with Multi-SF scheduling with uplink TDM (e.g., dynamic uplink CC change at subframe level) are needed in this invention.

FIG. 9 shows an example of time flow by controlling HARQ-ACK timing with Multi-SF scheduling with uplink TDM according to an exemplary embodiment of the present invention.

Referring to FIG. 9, When an uplink is shared by multiple CCs or eNBs (i.e., UE is served by multiple eNBs by inter-site CA or is configured with multiple CCs), one feasible approach as discussed in this contribution is to use TDM method. In that example, to minimize the impact on HARQ-ACK, one simple approach is to define an anchor or reference downlink subframe for each available uplink subframe. For example, in FDD, the anchor or reference subframe of n+4th uplink subframe is nth downlink subframe.

In TDD, the anchor downlink subframe is the first downlink n-kth subframe where k>=4 for nth uplink subframe. More specifically, only those downlink subframes can carry DCIs and other downlink subframes between anchor subframes can carry only PDSCHs or PMCHs. The HARQ-ACK transmitted in nth subframe includes ACK/NACK for downlink subframes whose ACK/NACK has not been transmitted up to the anchor downlink subframe.

For example, subframe 1 and 6 are anchor downlink subframes for uplink 5 and 10, HARQ-ACK transmitted in subframe 5 includes all the ACK/NACKs till DL subframe 1 and HARQ-ACK transmitted in subframe 10 includes all the ACK/NACKs between subframe 2 to 6 of downlink subframes. The same thing can be applicable. More specifically, for TDD, downlink anchor subframes are subframes indicated by Table 4 (e.g., n-8, n-7, n-4, n-6 for TDD UL/DL configuration 2). The Table 4 shows the Downlink association set index for TDD.

TABLE 4

| UL/DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

HARQ-ACK transmitted in nth subframe includes all associated downlink subframes (i.e., anchor subframes) and downlink subframes up to n-k which is the smallest k in downlink association set index (k; whose ACK/NACK have not been transmitted. For example for configuration 2, if only 2nd uplink subframe is available, all downlink subframes will be mapped to 2nd uplink.

More specifically, the selection of ACK/NACK container can be decided based on the followings.

Alt1: the number of DL subframes between anchor downlink subframes. If there is more than zero DL SF, PUCCH Format 3 is used. If there is one DL SF, PUCCH 1b with channel selection is used. If there is more than one DL SF, PUCCH format 3 is used. If there is more than zero DL SF with CA configured, PUCCH format 3 is used. If there is more than 22 bits of ACK/NACK transmitted with PUCCH format 3, spatial bundling or ACK/NACK bundling is used even in FDD and TDD UL/DL configuration 0 (at least one CC is configured with TDD UL/DL configuration 0 or at least one CC s reference configuration is TDD UL/DL configuration 0).

Alt2: the number of ACK/NACK bits assuming only anchor DL subframe carries (E)PDCCH. This approach can lead some misalignment between eNB and UE.

Alt3: format is higher layer configured. For example, PUCCH Format 3 can be configured to be used regardless of number of DL subframes. If PUCCH Format 1b with channel selection is configured, ACK/NACK bundling over multiple DL subframes will be used to make two bits of ACK/NACK with single CC configured and one bit of ACK/NACK with two CCs configured.

Alt4: format is pre-fixed to use PUCCH format 3. Or, PUCCH format 3 in TDD and PUCCH format 1a/1b in FDD regardless of the number of DL subframes.

FIG. 10 is a block diagram showing a wireless communication system according to an embodiment of the present invention.

A BS 1050 includes a processor 1051, a memory 1052, and a radio frequency (RF) unit 1053. The memory 1052 is coupled to the processor 1051, and stores a variety of information for driving the processor 1051. The RF unit 1053 is coupled to the processor 1051, and transmits and/or receives a radio signal. The processor 1051 implements the proposed functions, procedures, and/or methods. In the embodiments of FIG. 2 to FIG. 9, the operation of the BS can be implemented by the processor 1051.

Especially, the processor 1051 may configure at least one serving cell configuration for uplink transmission and optionally configure at least two serving cells for uplink transmission simultaneously. Herein, the cell configuration includes an index of the cell, a center frequency of each cell, and information of CA between the serving cells for uplink transmissions by one of a RRC signal, MAC signal, and a PHY signal including CIF on PDCCH. The cell configuration includes enabling information for the uplink transmission with a specific serving cell where the uplink transmissions is occurred. The enabling information of multiple PUSCH or PUCCH is transmitted by one of the RRC signal, the MAC signal, and the PHY signal.

The processor 1051 may configure the enabling information to indicate PUSCH or PUCCH transmission via at least two uplink serving sell and transmit the enabling information to the UE. The processor 1051 may set maximum power of PUSCH or PUCCH transmission of the UE and figure out the PUSCH or PUCCH transmission corresponding to the serving cell such as RACH procedure, SRS/CSI/UCI configuration. This invention can include that the processor 1051 manages and determines at least one ACK/NACK and retransmits the PUSCHs for the transmission following a reference configuration for both PCell and SCell, or a reference cell.

Whereas, an wireless device 1060 includes a processor 1061, a memory 1062, and an RF unit 1063. The memory 1062 is coupled to the processor 1061, and stores a variety of information for driving the processor 1061. The RF unit 1063 is coupled to the processor 1061, and transmits and/or receives a radio signal. The processor 1061 implements the proposed functions, procedures, and/or methods. In the embodiments of the FIG. 2 to FIG. 9, the operation of the UE can be implemented by the processor 1061.

Especially, the processor 1061 may configure at least one serving cell configuration for uplink transmission and optionally configure at least two serving cells for uplink transmission simultaneously. Herein, the cell configuration includes an index of the cell, a center frequency of each cell, and information of CA between the serving cells for uplink transmissions by one of a RRC signal, MAC signal, and a PHY signal including CIF on PDCCH. The cell configuration includes enabling information for the uplink transmission with a specific serving cell where the uplink transmissions is occurred. The enabling information for multiple PUSCH or PUCCH is received by one of the RRC signal, the MAC signal, and the PHY signal.

More details, the processor 1061 determines a corresponding serving cell indicated for the uplink transmission, by using one of SIB indication on PCell uplink, a RRC signaling to change the uplink, a MAC CE change, a Paging to change the uplink, RACH to change the uplink and scheduling with CIF field in DCI, as for enabling information. The processor 1051 controls the uplink transmission with PUSCH or PUCCH transmission via at least one, two uplink serving sells. The processor 1061 also controls powers of the PUCCH and PUSCH configured to different CC as the two uplink serving sells and performs a corresponding RACH procedure.

This invention can include that the processor 1061 determines that SRS, CSI, UCI can be changed according to the PUCCH association or PUSCH association via a corresponding serving cell. Also, the processor 1061 adjusts HARQ-ACK timing with uplink TDM shared by multiple CCs or eNBs.

The processor may include application-specific integrated circuit (ASIC), other chipset, logic circuit and/or data processing device. The memory may include read-only memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

The invention claimed is:

1. A method for transmitting uplink transmission in a wireless communication system supporting multiple carriers, performed by a wireless device, the method comprising:
   receiving a physical downlink control channel (PDCCH) order on either a primary serving cell (PCell) or a secondary serving cell (SCell) to change the unlink transmission for the wireless device,
   wherein the PCell or the SCell for the uplink transmission is changed alternatively, based on whether the PDCCH order is received on the PCell or the SCell, and
   wherein the PDCCH order is received in a random access channel (RACH) process;
   if the PDCCH order is received on the PCell,
      enabling the PCell for the uplink transmission, and
      transmitting a set of uplink channels via the enabled PCell for the uplink transmission,
      wherein the SCell is disabled, while the PCell is enabled for the uplink transmission; and
   if the PDCCH order is received on the SCell,
      enabling the SCell for the uplink transmission, and
      transmitting the set of uplink channels via the enabled SCell for the unlink transmission,
      wherein the PCell is disabled, while the SCell is enabled for the uplink transmission,
   wherein each uplink channel in the set of uplink channels includes at least one of a physical uplink control channel (PUCCH) and a physical uplink shared channel (PUSCH).

2. The method of claim 1, further comprising:
   configuring the PUCCH and the PUSCH via each of the PCell and the SCell separately,
   wherein the PUCCH is transmitted via the PCell and the PUSCH is transmitted via the PCell or the SCell, based on the received PDCCH order.

3. The method of claim 1, further comprising:
   configuring the PUCCH and the PUSCH via each of the PCell and the SCell separately, wherein the PUSCH is transmitted via the PCell and the PUCCH is transmitted via the PCell or the SCell, based on the received PDCCH order.

4. The method of claim 1, further comprising:
receiving a medium access control (MAC) signal which includes deactivating or activating the PCell and the SCell for the uplink transmission.

5. The method of claim 1, further comprising:
receiving a paging message to change alternatively the PCell or the SCell for the uplink transmission.

6. The method of claim 1, further comprising:
receiving a Carrier Indicator Field (CIF) in downlink control information (DCI) to change alternatively the PCell or the SCell for the uplink transmission.

7. The method of claim 1, further comprising:
transmitting a periodic Sounding Reference Signal (SRS) via either the enabled PCell or the enabled SCell transmitting the PUCCH,
wherein at least one of a channel-state-information (CSI) and an uplink control information (UCI) is transmitted via either the enabled PCell or the enabled SCell transmitting the PUCCH.

8. The method of claim 1, further comprising:
transmitting a periodic Sounding Reference Signal (SRS) via either the enabled PCell or the enabled SCell transmitting the PUSCH,
wherein at least one of a channel-state-information (CSI) and an uplink control information (UCI) is transmitted via either the enabled PCell or the enabled SCell transmitting the PUSCH.

9. The method of claim 1, further comprising:
changing physical random access channel (PRACH) transmission timing with a subframe dynamically, when the PRACH is scheduled to be transmitted via the PCell and the set of uplink channels is scheduled to be transmitted via the SCell at the subframe.

10. The method of claim 1, further comprising:
transmitting the PUCCH or the PUSCH using a reference configuration of the PCell or the SCell when a different Time Division Duplex (TDD) with two more serving cells is configured,
wherein, an ACK (Acknowledgement)/NACK (Non-Acknowledgement) for the PCell is transmitted by following the PCell configuration and an ACK/NACK for the SCell is transmitted by following the SCell configuration.

11. The method of claim 1, further comprising:
determining an ACK (Acknowledgement)/NACK (Non-Acknowledgement) timing via a serving cell,
wherein the ACK/NACK timing for a plurality of downlink subframes is mapped to one of sets of uplink subframes and/or channels.

12. A wireless device for transmitting uplink transmission in a wireless communication system supporting multiple carriers, the wireless device comprising:
a memory;
a transceiver; and
a processor, operatively coupled with the transceiver and the memory, and configured to:
control the transceiver to receive a physical downlink control channel (PDCCH) order on either a primary serving cell (PCell) or a secondary serving cell (SCell) to change the uplink transmission for the wireless device,
wherein the PCell or the SCell for the uplink transmission is changed alternatively, based on whether the PDCCH order is received on the PCell or the SCell, and
wherein the PDCCH order is received in a random access channel (RACH) process:
if the PDCCH order is received on the PCell,
enable the PCell for the uplink transmission, and
control the transceiver to transmit a set of uplink channels via the enabled PCell for the uplink transmission,
wherein the SCell is disabled, while the PCell is enabled for the u link transmission; and
if the PDCCH order is received on the SCell,
enable the SCell for the uplink transmission, and
control the transceiver to transmit the set of uplink channels via the enabled SCell for the uplink transmission,
wherein the PCell is disabled, while the SCell is enabled for the uplink transmission,
wherein each uplink channel in the set of uplink channels includes at least one of a physical uplink control channel (PUCCH) and a physical uplink shared channel (PUSCH).

* * * * *